C. KEAIRNES.
AIR HEATING DEVICE FOR GAS ENGINES.
APPLICATION FILED SEPT. 4, 1914.
1,172,143.
Patented Feb. 15, 1916.
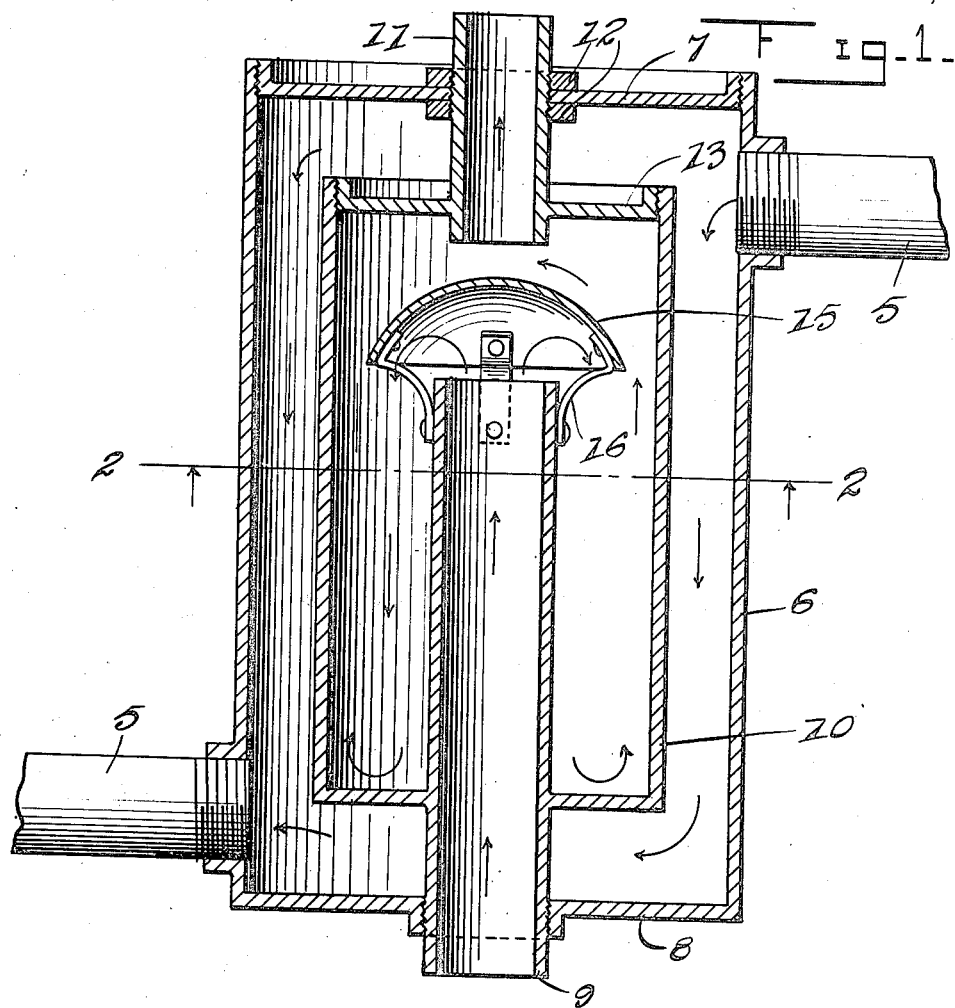
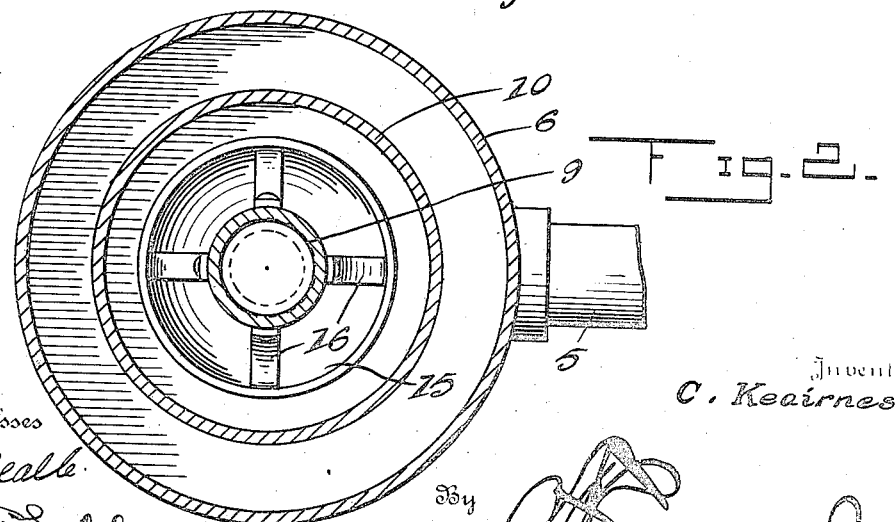
Witnesses
Inventor
C. Keairnes.
By

UNITED STATES PATENT OFFICE.

CORNELIUS KEAIRNES, OF SOLDIER, IOWA.

AIR-HEATING DEVICE FOR GAS-ENGINES.

1,172,143.

Specification of Letters Patent.  Patented Feb. 15, 1916.

Application filed September 4, 1914. Serial No. 860,237.

*To all whom it may concern:*

Be it known that I, CORNELIUS KEAIRNES, a citizen of the United States, residing at Soldier, in the county of Monona and State of Iowa, have invented certain new and useful Improvements in Air-Heating Devices for Gas-Engines; and I do hereby declare the following to be a full, clear, and exact description of the invention, such as will enable others skilled in the art to which it appertains to make and use the same.

This invention relates to devices especially designed for heating the air previously to admission to the carbureter of an internal combustion engine for insuring a dry and warm mixture of the fuel.

The invention has for its object to provide a device of this character of improved and simplified construction which shall be inexpensive to manufacture and quickly and conveniently adaptable to various types of stationary and portable gas engines.

With this and other objects in view, the invention consists in the novel construction, arrangement and formation of parts as will be hereinafter specifically described, claimed and illustrated in the accompanying drawing, in which:

Figure 1 represents a diametrical sectional view through the device, and Fig. 2 represents a sectional view on the line 2—2 of Fig. 1.

Referring to the drawing in detail, wherein similar reference numerals designate corresponding parts throughout the several views, the numeral 5 indicates sections of the exhaust pipe of an internal combustion engine, which sections are preferably screw-threaded and fitted within openings formed adjacent the upper and lower extremities of a hollow cylindrical casing 6 having the removable upper end 7 and apertured bottom 8. An air pipe 9 is secured concentrically within the bottom 8 of the casing 6 and extends a distance inwardly of the latter into a drum 10 arranged in spaced relation within the casing 6. The drum 10 is formed at its upper end with an outlet pipe 11 for the air which extends through the top or cover 7 of the casing and is secured in the latter by nuts 12, or equivalent means. The top 13 of the drum is preferably removable, whereby access may be readily obtained to the interior thereof. A concavo-convex deflector 15 is arranged with its concave face disposed toward the inner end of the inlet air pipe 9 and is secured over the upper end of the latter by a plurality of straps 16.

In use, the exhaust gases escaping from the cylinders of the gas engine (not shown) pass into the casing 6 through the inlet pipe 5 and completely inclose the drum 10, leaving the casing through the outlet pipe 5. The air to be admitted to the carbureter for vaporizing and mixing with the gasolene enters the drum 10 through the pipe 9 and is deflected against the side wall of said drum by the concavo-convex deflector plate 15, the air leaving the drum through the outlet pipe 11. The heated exhaust gases from the engine circulating about the drum 10 thoroughly heat the latter and the air circulating therethrough and thus insure a dry, warm air for admission to the carbureter.

While I have shown the casing of cylindrical formation and vertically disposed, it will be understood that the shape thereof may be varied to accord with the requirements of various types of stationary and portable gas engines.

What I claim is:

1. A device of the character described comprising a casing, inlet and outlet pipes communicating with said casing adjacent the opposite extremities thereof, a heating drum completely inclosed by said casing and arranged in spaced relation thereto, an inlet pipe extending through one end of said casing and a distance into said drum, an outlet pipe communicating with said drum and extending through the opposite end of said casing, and a concavo-convex deflector plate secured over and in spaced relation to the inner end of said inlet pipe.

2. A device of the character described comprising a casing including an apertured bottom and a removable cover, a heating drum arranged in spaced relation within said casing including a removable cover and an apertured bottom, an inlet pipe secured in the apertures in the bottom of said casing and heating drum and communicating with the latter, an outlet pipe communicating with said heating drum and extending through and rigidly secured in the cover of said drum, and means removably securing said outlet pipe in the cover of said casing.

In testimony whereof I affix my signature in presence of two witnesses.

CORNELIUS KEAIRNES.

Witnesses:
T. B. LUTZ,
DON C. LUTZ.